R. P. PICTET.
APPARATUS FOR SEPARATING NITROGEN AND OXYGEN FROM MIXTURES CONTAINING THEM.
APPLICATION FILED MAY 26, 1904.
918,589.
Patented Apr. 20, 1909.
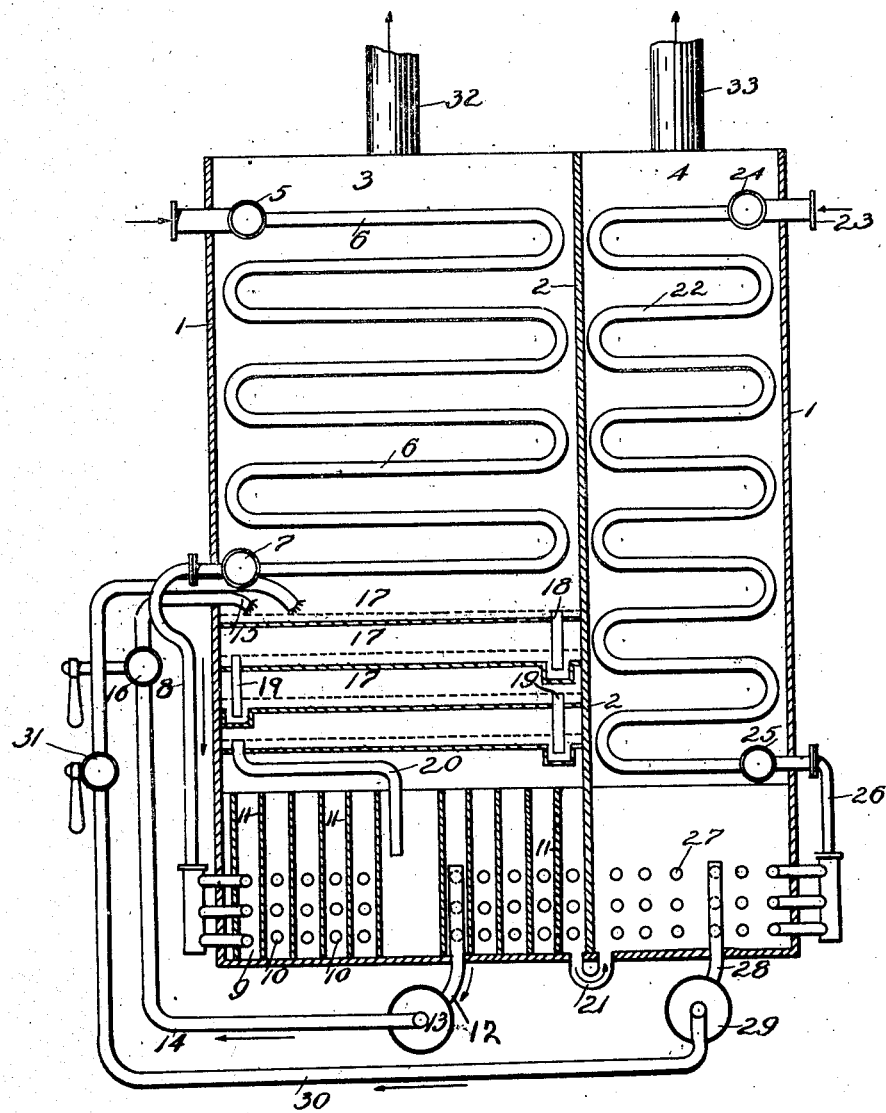
Witnesses
Inventor
Raoul Pierre Pictet

UNITED STATES PATENT OFFICE.

RAOUL PIERRE PICTET, OF BERLIN, GERMANY.

APPARATUS FOR SEPARATING NITROGEN AND OXYGEN FROM MIXTURES CONTAINING THEM.

No. 918,589.  Specification of Letters Patent.  Patented April 20, 1909.

Application filed May 26, 1904.  Serial No. 209,984.

*To all whom it may concern:*

Be it known that I, RAOUL PIERRE PICTET, professor and doctor of philosophy, a citizen of the Republic of Switzerland, residing at 2 Wattstrasse, Berlin, Prussia, German Empire, have invented a new and useful Apparatus for Separating Nitrogen and Oxygen from Mixtures Containing Them, Especially from Atmospheric Air, of which the following is a specification.

My invention relates to improvements in apparatus for separating nitrogen and oxygen from mixtures containing them. For this purpose apparatus have been used in which the separation of the gases is effected by continuously fractionally distilling the gas mixture previously brought into the fluid state by any method apt for this purpose. For instance, one may fractionally distil fluid air by using as heating means compressed air, that has not been compressed and cooled to the point where it will be in the fluid state.

The objects of my improvement are to provide an apparatus of the said kind which will be more cheap, more easily to be built up and more sure and more efficient in its operation than the apparatus hitherto known of the said kind. I attain these objects by the mechanism illustrated in the accompanying drawing in a vertical section.

The apparatus comprises a rectangular case with parallel walls, 1, the said case being divided into two sections 3 and 4 by a partition 2. The volumes of the two sections relate to each other as about two to one. The larger section 3 is intended to separate the nitrogen, the smaller part 4 to separate oxygen. The upper part of the section 3 is arranged that it may effect an interchangement of heat.

The air (or another gas of like composition) previously compressed, filtered and cooled by any suitable process is introduced into the horizontally situated tube 5, the axis of which is perpendicular to the plan of the figure. A series of parallel serpentine pipes 6 is connected with the said tube 5. In the drawing only one serpentine pipe is illustrated, but in employing my apparatus practically I use several such pipes, the number of which the skilled workmen will select according to the effect desired. I prefer to place the serpentine pipes as near as possible to each other. The compressed atmospheric air is led from above to below through the serpentine pipes and other gases are led through the apparatus from below to above. The last mentioned gases will cool progressively the compressed air going through the serpentine pipe, 6. I may arrange between the branches of the serpentine pipe means to facilitate the exchange of heat between the compressed gases entering into the apparatus and the gases leaving the apparatus, as for instance, metal chips or shavings. From the pipe 6 the compressed air enters into the tube 7 which acts as a collector and from this tube 7 the air is led by means of tube 8, preferably situated out of the rectangular case, a part of which is the section 3, to the bottom of the apparatus, into the lower compartment 9. The said compartment 9 contains a series of spiral coils 10, separated by partitions 11. If one has brought a certain amount of liquid air into the compartment 9, a liquefaction of air will be effected in the coils 10.

The coils 10 end in a central tube 12. From this tube 12 which may be provided with valves in connection with the coils 10, the liquid air is led under pressure to the filter 13, where the carbonic acid present in the air and solidified is separated. It is preferable to use two filters for the solidified carbonic acid so that they may be used alternately, the one being cleaned and emptied, the other being in use. The liquid air comes from the filter 13 to the tube 14 leading from below to above. The tube 12, the filter 13 and the tube 14 are situated preferably out of the rectangular case 3. The liquid air returns from the tube 14 at 15 to the compartment 3. In the tube 14 a valve 16 is arranged, by which valve the working of the apparatus may be regulated and controlled. Between the serpentine pipe 6 and the coils 10 a series of horizontal plates 17, 17 of convenient construction are arranged. The said plates 17, 17, may be provided with perforations. The perforations of the plates may be varied according to the place in which the plates are situated in the apparatus. If four plates are used the plates near to the bottom may have openings of 1 to 2 millimeters wide and the plates placed upon the first plate may have openings of 4 to 5 millimeters wide. The skilled workman will select the width of the openings and the selection of the plates suitable to his special purpose by experiments. The liquid air being spread over the said plates 17, 17 will fill all the space. It cannot go directly to the lower space because there is a certain pressure of the gases coming from below to above and a capillary action will act on the liquid in the lower plates. The gases evolved by spontaneous vaporization of the liquid air led through the apparatus from below to above, traverse the plates and are divided into many bubbles which are mixed with the liquid intimately. The liquid air led to the upmost plate 17 is there accumulated until it reaches the level of the overflow tube 18, through which it falls then downward to the lower plate 17, where it accumulates again until it reaches the level of the overflow tube 19, from which it comes to the third plate and so on. I have found by experiments that generally three or four plates will give the best results. Finally the liquid air is conducted from the last plate by means of the tube 20 to the center of the lower compartment of the case 3. The total liquefaction of the compressed air going through the coils 10 evolves heat which causes evaporation and ebullition of the surrounding liquid air. Firstly nitrogen will be evaporated, then a mixture of nitrogen and oxygen will be evolved. The liquid air coming to the circumference of the coils 10 is conducted through the U-shaped tube 21 into the compartment 4 of the case 1. In the upper part of the said compartment 4 a serpentine pipe 22 acting as heat interchanger is arranged of similar form as the serpentine pipe 6. Through the tube 23 compressed and cooled air is introduced. The introduced compressed and cooled air flows into the horizontal tube 24 and then into the parallel coils 22. From here the gases flow to the collecting tube 25 and are led through the tube 26 to the coils 27. The completely liquefied air is led by the tube 28 to the filter for solid carbonic acid 29, traverses the said filter and escapes through the tube 30 provided with a valve 31 allowing the regulation of the working. The air is conducted on the upper plates 17 of the compartment 3. The separation of the gases is completed here. Nearly pure nitrogen escapes at 32, oxygen at 33. The working is continuous. The working of the apparatus is only regulated by the valves 16 and 31. From time to time the solid carbonic acid is separated from the filters 13 and 29.

What I claim, and desire to secure by Letters Patent of the United States, is:

An apparatus for separating nitrogen and oxygen from mixtures containing them consisting of a case divided into a large and a small compartment, the large compartment being intended for the separation of nitrogen and the small one for oxygen, serpentine pipes in the upper part of the large compartment, means for introducing compressed gases to said pipes, spiral coils in the lower part of said compartment connected with the said serpentine pipes, plates situated in the middle of said compartment, means for leading the fluid from the said coils to the said plates, a passage leading from the large compartment to the small compartment said passage being beneath the plates, serpentine pipes in the upper part of the small compartment, and spiral coils in the lower part thereof connected with the said pipes, means for introducing compressed gases to the serpentine pipes and means for leading the fluid from the coils in the small compartment to the plates in the large compartment.

In witness whereof I have hereunto signed my name this tenth day of May 1904 in the presence of two subscribing witnesses.

RAOUL PIERRE PICTET.

Witnesses:
HANSON C. COXE,
JOHN BAKER.